Dec. 10, 1929.   W. O. WEBSTER   1,739,430
RELIEF VALVE
Filed Jan. 5, 1928
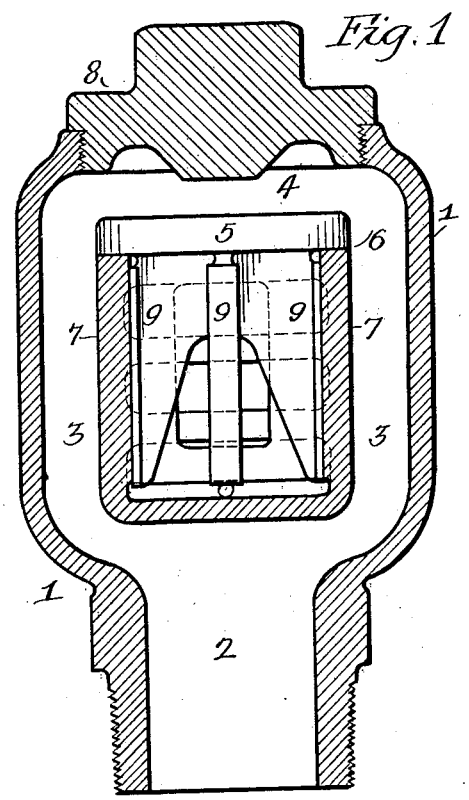
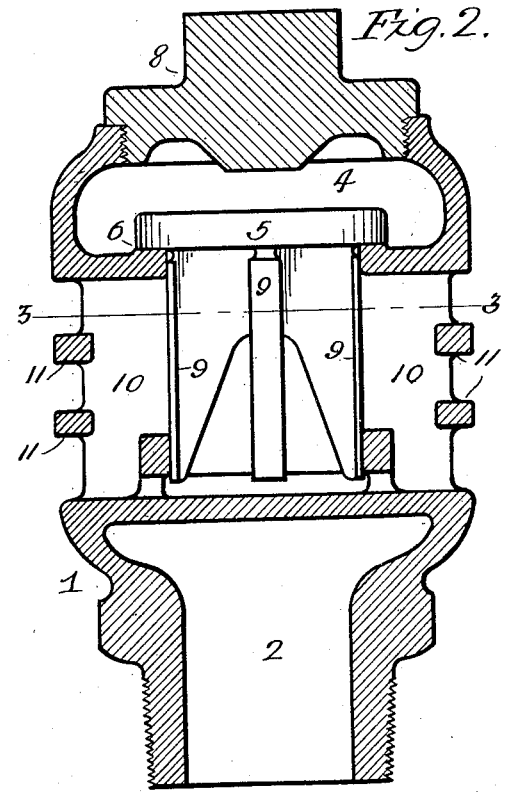
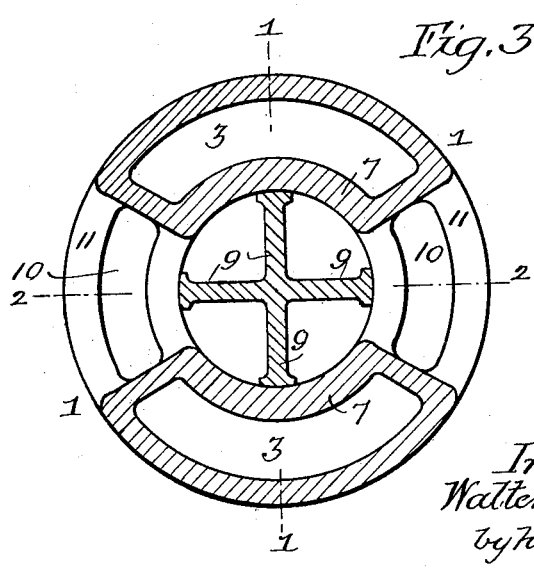
Inventor:
Walter O. Webster
by his Attorneys
Howson & Howson Patented Dec. 10, 1929

1,739,430

UNITED STATES PATENT OFFICE

WALTER O. WEBSTER, OF WESTMONT, NEW JERSEY

RELIEF VALVE

Application filed January 5, 1928. Serial No. 244,698.

The object of my invention is to so construct a relief valve that the steam pressure will tend to retain the valve in its closed position, except when there is a partial vacuum created in the steam line, then the valve will be raised by atmospheric pressure.

A further object of the invention is to prevent the "chattering" of the relief valve which, in some instances, is so great in large valves that the valve will crack or break under the severe hammering.

In the accompanying drawing—

Figure 1 is a sectional view of my improved relief valve, the section being on the line 1—1 of Fig. 3;

Fig. 2 is a sectional view on the line 2—2 of Fig. 3; and

Fig. 3 is a sectional view on the line 3—3 of Fig. 2.

Referring to the drawings, 1 is a valve casing having a passage 2 for steam and this passage connects with segmental side passages 3, which, in turn, communicate with a steam space 4 above the valve 5 which closes against a seat 6 on the inner shell 7 of the valve casing.

8 is a threaded cap which is adapted to the threaded opening in the upper end of the valve casing 1. This opening is of sufficient diameter to allow for the removal of the valve 5 when necessary, and also for the regrinding of the seat on which the valve rests.

The valve 5 has depending wings 9 which allow for the passage of air when the valve is raised off its seat, these wings fitting the inner shell and acting as guides for the valve 5.

The valve casing has an air channel 10 at each side, as shown in Fig. 3, so as to allow air to gain access to the underside of the valve 5 when vacuum is created in the steam passage 2.

Extending across the openings 10 are ribs or bars 11 formed integral with the casing 1, but this construction may be modified without departing from the essential features of my invention.

This relief valve is connected to the steamchest of a locomotive so that, when the locomotive is drifting with the throttle closed and a partial vacuum is created in the steam chest, the valve will be lifted off its seat by the air under atmospheric pressure which passes through the openings 10 in the underside of the valve 5. Thus the partial vacuum will be broken by the incoming air, and as soon as steam again enters the valve chest, the steam will flow through the passages 2, 3 and 4 of the casing, closing the valve 5 and holding it closed until the locomotive again drifts with the throttle closed, when the valve will again be opened as above stated.

I claim:

1. The combination in a relief valve, of a casing having inner and outer walls forming a main steam space and segmental steam spaces between said walls; an upper steam space communicating with the segmental steam spaces; a cap for the casing; a valve located in the upper steam space and having guiding wings located within the inner walls of the casing; and segmental openings communicating with the space under the valve so that when a partial vacuum is formed in the steam passages of the casing the air under atmospheric pressure will raise the valve off its seat.

2. The combination in a relief valve, of a casing having inner and outer walls; a main steam passage; segmental steam spaces between the said inner and outer walls communicating with the steam passage; an upper steam space communicating with the segmental steam spaces; radiating partitions separating the segmental steam spaces from segmental exhaust spaces which open to the atmosphere and communicate with the chamber within the inner walls of the casing; a series of bars extending across the exhaust openings flush with the outer walls of the casing; and a valve located in the upper steam space and having guiding wings located within the inner chamber, said valve being seated upon the upper surface of the inner walls, the parts being so arranged that when a partial vacuum is formed in the steam passages of the casing the air under atmospheric pressure will raise the valve off its seat.

WALTER O. WEBSTER.